UNITED STATES PATENT OFFICE.

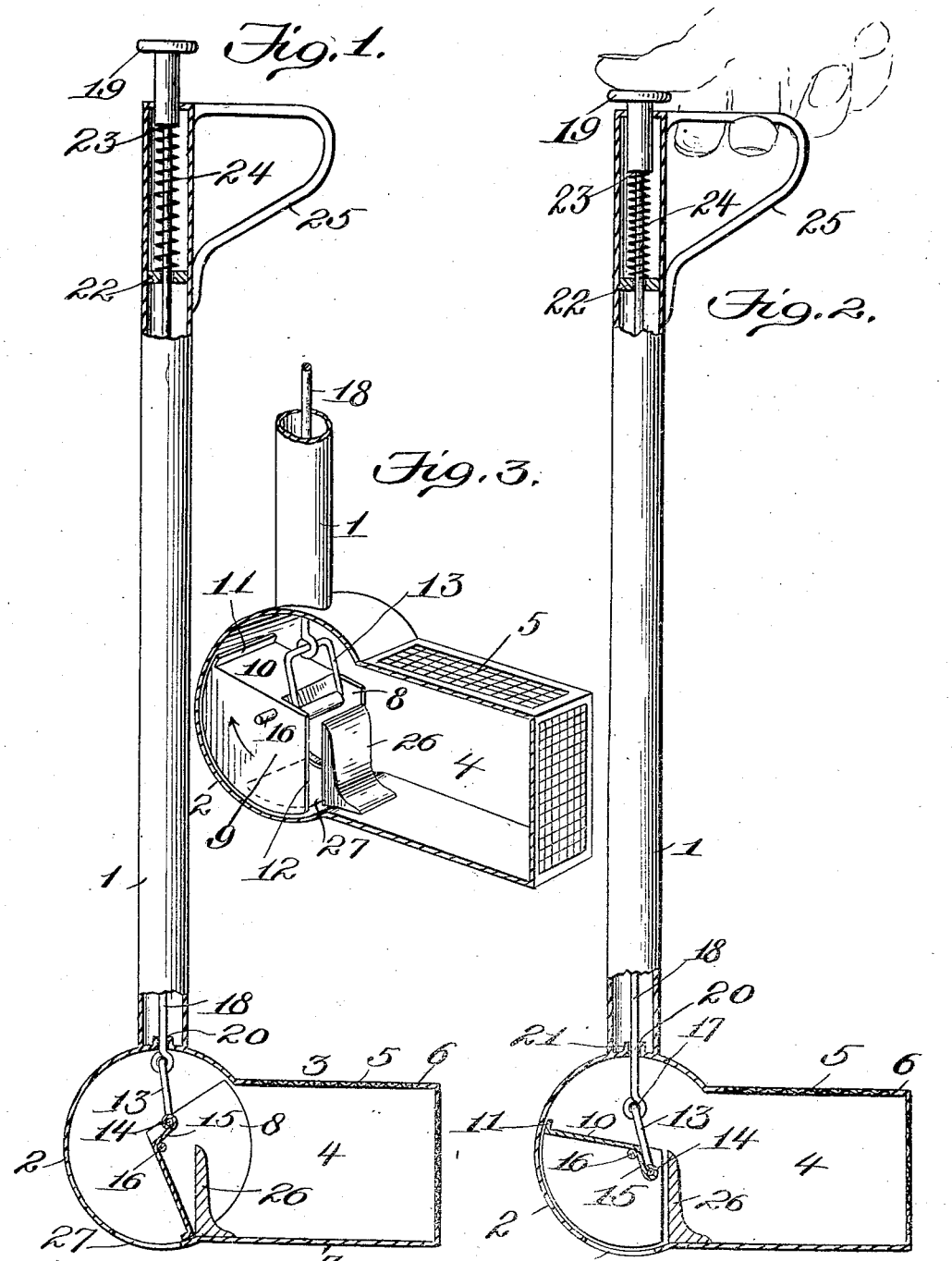

SAMUEL T. CRAWFORD, SR., OF BALTIMORE, MARYLAND.

GLEANER.

No. 908,208.      Specification of Letters Patent.      Patented Dec. 29, 1908.

Application filed July 15, 1907, Serial No. 383,859. Renewed May 22, 1908. Serial No. 434,375.

*To all whom it may concern:*

Be it known that I, SAMUEL T. CRAWFORD, Sr., a citizen of the United States, residing at Baltimore city, in the State of Maryland, have invented new and useful Improvements in Gleaners, of which the following is a specification.

This invention relates to gleaners, and the object thereof is to provide a gleaner in a manner as hereinafter set forth, particularly adapted for the gathering of nuts, and to this end the invention aims to provide a gleaner which shall be simple in construction, strong, efficient in its use, conveniently operated, and comparatively inexpensive to manufacture.

With the foregoing and other objects in view, the invention consists in the novel construction, combination and arrangement of parts hereinafter more specifically described and illustrated in the accompanying drawings, wherein is shown the preferred embodiment of the invention, but it is understood that changes, variations and modifications can be resorted to which come within the scope of the claims hereunto appended.

In the drawings, wherein like reference characters denote corresponding parts throughout the several views:—Figure 1 is a sectional elevation of a gleaner in accordance with this invention, showing the nut projecting member in its normal or inoperative position. Fig. 2 is a like view, showing the nut projecting member in its operative position, and Fig. 3 is a perspective view of the lower portion of the gleaner with the nut gathering member in its operative position.

Referring to the drawings by reference characters, 1 denotes an elongated tube, of such length as to prevent the operator stooping when gathering the nuts and at its lower end the tube 1 terminates in the cylindrical portion 2 of a gathering receptacle referred to generally by the reference character 3. The receptacle 3 comprises the cylindrical portion 2 and a rectangular portion 4. The top and one end of said rectangular portion 4 is formed of foraminous material, as indicated at 5. The top wall 6 of the rectangular portion 4 is of less length than the bottom wall and the inner end of the walls 6—7 terminates in the cylindrical portion 2.

Suspended within the cylindrical portion 2 is a nut projecting member consisting of a pair of quadrant-shaped side members 8—9 having the top thereof connected together by the cross piece 10 which has one end formed with a transversely extending flange 11. The cross piece 10 is of less length than the top of the side members 8—9 so as to terminate at a point removed from the edges 12 of said members 8—9. Extending between the members 8—9 is a link 13 having its lower end pivoted as at 14 to a link 15 which in turn is mounted upon a pivot 16 supported in the side members 8—9. The link 15 is formed integral with the cross piece 10. The upper end of the link 13 is pivotally connected as at 17 to the lower end of a spring controlled push rod 18 which extends through the casing 1 and carries on its outer or upper end a thumb piece or button 19.

The cylindrical portion 2 is formed in its top with an opening 20 through which extends the rod 18. Flanges 21 are provided as a bearing for the lower end of the said rod 18. Within the casing 1 near the top thereof is secured an apertured cross piece 22 through which extends the rod 18, said cross piece also serving as a bearing for the rod 18. The latter near its upper end is shouldered as at 23 and mounted upon said rod and interposed between the shoulder 23 and cross piece 22 is a compression spring 24, the function of which is to return the rod 18 to its normal position, the latter in turn shifting the nut projecting member to normal position. A handle 25 is attached to the casing 1 near the top thereof. Arranged within the rectangular portion 4 of the gathering receptacle 3 and upon the bottom 7 is a vertically extending stop 26 for the gathered nuts. The stop 26 is of a width to enable the shifting of the nut projecting member and when the nut projecting member is in its normal position, the stop piece 26 is inclosed by the members 8—9, as clearly shown in Fig. 1.

An entrance opening for the nuts to be gathered is provided in the bottom of the cylindrical portion 2 and is indicated by the reference character 27.

The gleaner is operated in the following manner: It will be assumed that the parts are in the position as shown in Fig. 1. The operator mounts the gleaner over a nut so that the nut will extend through the opening 27. By pressing down on the rod 18, the nut projecting member will be shifted to the position shown in Fig. 2 and as the nut which extends through the opening 27 is in the path of the nut projecting member, when the latter is shifted to the position shown in Fig. 2, it will carry the nut therewith and project the nut over into the rectangular portion 4 of the receptacle 3. When pressure is removed from the rod 18, the spring 24 automatically returns the rod to the position shown in Fig. 1 to enable the operator to collect another nut, if desired. The stop 26 prevents the nuts within the rectangular portion 4 of the receptacle 3 from entering the cylindrical portion 2 when using the gleaner or unless the gleaner is inverted so that the nuts within the portion 4 can be turned into the cylindrical portion 2 by passing over the top of the stop and between the members 8—9. The nuts are discharged when occasion so requires through the opening 27.

What I claim is:—

1. A gleaner comprising a gathering receptacle provided with an interiorly arranged stop piece and further having an entrance opening for the article to be gathered, an oscillatory article projecting member pivoted within said receptacle and in operative relation with respect to said entrance opening, a manually operated rod for oscillating said member in one direction to project the article into said receptacle, and means engaging said rod for automatically returning it to normal position, and oscillating said member in an opposite direction.

2. A gleaner comprising a receptacle having a stop arranged therein intermediate the ends thereof, said receptacle further provided with an entrance opening, an oscillatory article projecting member pivoted within said receptacle, a push rod, a link connection pivoted at one end to said member and at its other end to said push rod and adapted when the push rod is moved in one direction to shift said member and project an article in said receptacle, and a spring for automatically returning said push rod to normal position, and shifting said member in an opposite direction.

3. A gleaner comprising a receptacle embodying a cylindrical and a rectangular portion, a stop piece arranged in said rectangular portion, an article projecting member pivoted within said cylindrical portion, a spring controlled push rod extending in said cylindrical portion, and a pivotal connection between said push rod and said member for oscillating the member when the push rod is reciprocated.

4. A gleaner comprising a receptacle having an entrance opening and further having an interiorly arranged stop piece positioned intermediate the ends of said receptacle, an elongated casing connected to said receptacle, a reciprocatory push rod extending through said casing and into said receptacle, an oscillatory article projecting member pivoted within one end of said receptacle, and a pivotal connection between said push rod and said member for oscillating the latter when said rod is reciprocated.

5. A gleaner comprising a receptacle having an entrance opening and further having an interiorly arranged stop piece positioned intermediate the ends of said receptacle, an elongated casing connected to said receptacle, a reciprocatory push rod extending through said casing and into said receptacle, an oscillatory article projecting member pivoted within one end of said receptacle, a pivotal connection between said push rod and said member for oscillating the latter when said rod is reciprocated, and a handle projecting laterally from the top of said casing.

6. A gleaner comprising a gathering receptacle provided with an interiorly arranged stop piece and further having an entrance opening for the article to be gathered, an oscillatory flanged article projecting member pivoted within said receptacle and in operative relation with respect to said entrance opening, a manually operated rod for oscillating said member in one direction to project an article into said receptacle, and means engaging said rod for automatically returning it to normal position, and oscillating said member in an opposite direction.

7. A gleaner comprising a receptacle having a stop arranged therein intermediate the ends thereof, said receptacle being further provided with an entrance opening, an oscillatory flanged article projecting member pivoted within said receptacle, a push rod, a link connection pivoted at one end to said member and at its other end to said push rod and adapted when the push rod is moved in one direction to shift said member to project an article in said receptacle, and a spring for automatically returning said push rod to normal position, and shifting said member in an opposite direction.

8. A gleaner comprising a receptacle embodying a cylindrical and a rectangular portion, a stop piece arranged in said rectangular portion, a flanged article projecting member pivoted within said cylindrical portion, a spring controlled push rod extending into said cylindrical portion, and a pivotal connection between said push rod and said member for oscillating the member when the push rod is reciprocated.

9. A gleaner comprising a receptacle having an entrance opening and further having an interiorly arranged stop piece positioned intermediate the ends of said receptacle, an elongated casing connected to said receptacle, a reciprocatory push rod extending through said casing and into said receptacle, an oscillatory flanged article projecting member pivoted within one end of said receptacle, and a pivotal connection between said push rod and said member for oscillating the latter when said rod is reciprocated.

In testimony whereof I have hereunto set my hand in presence of two subscribing witnesses.

SAMUEL T. CRAWFORD, Sr.

Witnesses:
 DAVID N. E. CAMPBELL,
 WILLIAM J. P. WILLIAMS.